United States Patent [19]
Zaenkert

[11] 3,966,617
[45] June 29, 1976

[54] SLUDGE ELEVATOR FOR FLUID CLARIFICATION SYSTEM

[75] Inventor: Fred A. Zaenkert, Cincinnati, Ohio

[73] Assignee: The Cincinnati Butchers' Supply Co., Cincinnati, Ohio

[22] Filed: Oct. 7, 1974

[21] Appl. No.: 512,495

[52] U.S. Cl................................ 210/519; 210/525
[51] Int. Cl.² ........................................ B01D 21/14
[58] Field of Search .................. 210/65, 66, 69, 71, 210/73, 83, 84, 523, 532 R, 525, 519

[56] References Cited
UNITED STATES PATENTS

| | | | |
|---|---|---|---|
| 1,422,514 | 7/1922 | Arbuckle | 210/523 X |
| 1,648,607 | 11/1927 | Brown | 210/523 X |
| 2,678,912 | 5/1954 | Kalinske et al. | 210/523 X |
| 2,695,710 | 11/1954 | Gibbs | 210/523 X |
| 2,713,026 | 7/1955 | Kelly et al. | 210/525 X |
| 2,843,270 | 7/1958 | Acosta | 210/71 X |
| 2,876,863 | 3/1959 | Kivari | 210/525 X |
| 3,175,692 | 3/1965 | Vrablik | 210/525 X |
| 3,705,649 | 12/1972 | Arvanitakis | 210/66 |

FOREIGN PATENTS OR APPLICATIONS 327,687  9/1918  Germany ........................... 210/523

Primary Examiner—Charles N. Hart
Assistant Examiner—Robert H. Spitzer
Attorney, Agent, or Firm—J. Warren Kinney, Jr.

[57] ABSTRACT

A fluid clarification device of the type which includes a cylindrical, flat-bottomed separator tank is provided with an elongate sludge collecting trough in the bottom of the tank having an upper portion in open communication with the interior thereof. A conveyor is disposed in the collecting trough for horizontally transporting sludge accumulated therein to a vertically disposed sludge elevator-conveyor in which the sludge is elevated to a discharge port above the fluid level of the separator tank whereby the discharged sludge will be substantially free of excess fluid.

1 Claim, 1 Drawing Figure

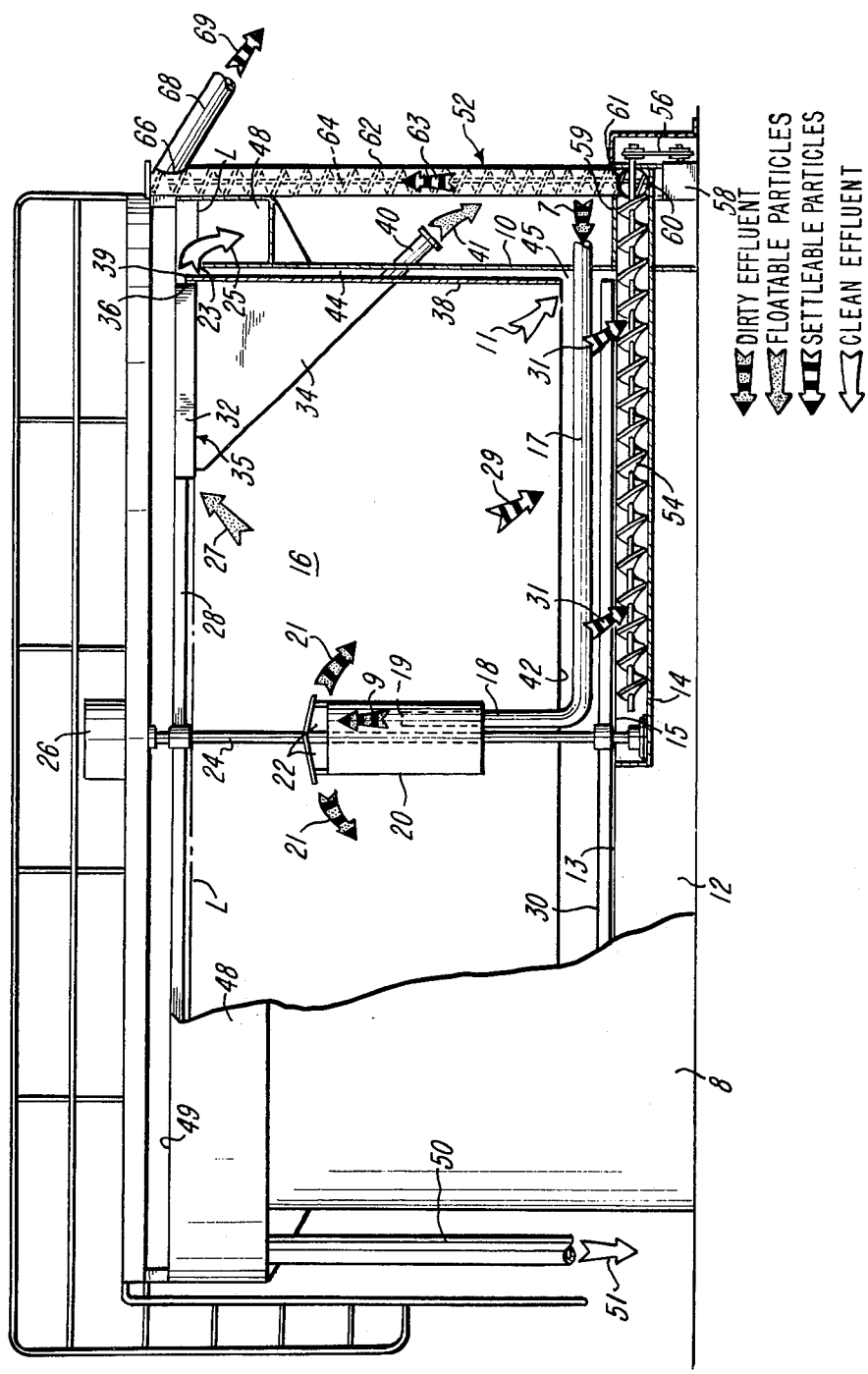

SLUDGE ELEVATOR FOR FLUID CLARIFICATION SYSTEM

BACKGROUND OF THE INVENTION

1. Field of the Invention

The present invention is directed to an apparatus for and method of separating suspended particulate matter from an effluent, and comprises a cylindrical separator tank having a substantially flat bottom including an elongate trough having an upper portion which is in free, open communication with the interior of the tank. When the particle-laden effluent is introduced into the tank, the floatable particulate matter suspended therein floats to the surface of the effluent and may be effectively skimmed therefrom, whereas the sedimentary or settleable particulate matter suspended therein settles as sludge at the bottom of the tank. The sludge at the bottom of the tank is scraped into the elongate trough and is transported to an outlet outside the tank wherein a substantially vertical conveyor-elevator elevates the sludge from the outlet to a discharge port above the fluid level of the tank.

2. Description of the Prior Art

Heretofore, it has been the custom to remove settleable particles from an effluent by passing the effluent through the separator tank of a conventional clarification system, wherein the settleable particles settle to the bottom of the tank and are collected at a central sump or pit in communication therewith. A scraper or the like at the bottom of the tank is utilized to transfer the settled particles into the sump, after which the particles are pumped from the sump in the form of sludge. In general, the sludge is excessively high in fluid content, and in some instances comprises as much as 98 percent water.

This problem has long plagued the meat packing industry, wherein the effluent which transports waste material from slaughtering and dressing operations generally includes grease, animal hair and nails, blood and other organic material which cannot be discharged into conventional sewage disposal systems. The effluent is first passed through a screening or filtering process wherein the larger solid particles are removed, resulting in a "dirty" effluent which includes floatable and settleable particles which are too small to be screened or filtered therefrom. The "dirty" effluent is introduced into the separator tank of a conventional clarification system, wherein the floatable particles such as grease, scum and the like accumulate at the surface of the effluent, and wherein the settleable particles settle out of the effluent at the bottom of the tank. The floatable particles are effectively skimmed from the surface of the effluent and collected for further processing, whereas the settled particles are collected at the central sump and discharged as sludge for subsequent disposal. The remaining, "clean" effluent is free of both settleable and floatable particles and may be discharged from the separator tank into conventional sewage disposal systems.

The sludge which is discharged from the tank is exceptionally high in fluid content, and before the solid waste therein may be suitably disposed, the sludge must be subjected to lengthy cooking and drying operations, wherein the fluids are removed through evaporation.

In the past, systems have been devised which provide an inclined conveyor in communication with the bottom of a tank, wherein sedimentary particulate matter is elevated to and discharged at a point above the fluid level of the tank, as shown, by way of example, in U.S. Pat. Nos. 2,189,418; 2,635,104 and 2,843,270. Further, it is known to provide an inclined conveyer in communication with the bottom of a conical separator tank, such as disclosed in U.S. Pat. No. 1,648,607 wherein centrifugal forces and gravity are utilized to separate suspended particulate matter from a fluid.

SUMMARY OF THE INVENTION

The present invention is adapted for use with known, conventional clarification systems and provides a means for and method of removing the accumulated settled particles in a form having a substantially reduced fluid content, thereby decreasing the time and expense involved in preparing said particles for final disposal.

Generally, an elongate scraper is disposed adjacent the flat bottom of the separator tank of a conventional system for rotation about the axis thereof for scraping accumulated particles into an elongate collecting trough in the bottom of the tank and having an upper portion in communication with the interior thereof. A horizontal conveyor in the trough transfers the particles in the form of sludge to a trough outlet outside the separator tank.

The present invention provides the means for and method of automatically draining the excess fluid from the sludge prior to discharge of the sludge from the clarification system, wherein a substantially vertical conduit is disposed in open communication with the trough outlet and includes a discharge port which is above the fluid level in the separator tank. A conveyor-elevator is mounted in and carried by the conduit and is adapted to elevate the sludge disposed at the outlet to the discharge port above the level of fluid in the tank, after which the sludge is discharged from the clarification system. As the sludge is elevated above the fluid level in the separator tank, excess fluid naturally and automatically drains from the sludge, minimizing the fluid content thereof.

For ease in understanding the objects of the present invention, the "dirty" effluent may be compared to soup which comprises solid components suspended in an aqueous solution. Conventional clarification systems of the type now in widespread use in the meat packing industry produce a sludge similar in form to the mixture that may be removed from the soup by means of a ladle or the like which is dipped into the soup and raised above the surface thereof. By utilizing the sludge elevator of the present invention, the sludge more closely resembles the mixture which may be removed from the soup by means of a sieve.

It is, therefore, a primary object of the invention to provide means for reclaiming the settleable particles from an effluent in a form which is substantially free of excess fluid.

It is, also, an object of the invention to provide a clarification system including means for elevating the reclaimed sludge to a point above the fluid level in the separator tank prior to discharge of the sludge from the system.

It is, further, an object of the invention to provide an apparatus for use with conventional clarification systems, thereby permitting changeover with minimum modification and expense without impairing the many advantages of presently developed systems.

While certain features and advantages of the present invention have been particularly described and illustrated in detail, it should be understood that such are not intended to limit the scope and spirit of the invention as defined by the claims appended hereto.

THE DRAWING

The drawing FIGURE illustrates the invention in its preferred form, in combination with a conventional clarification system.

DETAILED DESCRIPTION OF THE PREFERRED EMBODIMENTS

A conventional clarification system for separating suspended particulate matter from a fluid is illustrated in the drawing and comprises a cylindrical separator tank or container 8 having an outer vertical wall or shell 10 and a substantially flat bottom or base 12. The base includes an elongate trough 14 having an upper portion or mouth 15 which is in free, open communication with the interior 16 of the tank. The tank includes a vertical inner wall 38 which is concentric with, spaced inwardly from and suitably secured relative to outer wall or shell 10, forming a circumferential channel 44. Upper lip or edge 39 of wall 38 is disposed above fluid level L and forms a barrier for confining the floatable particles within the interior thereof. The lower lip or edge 42 of the inner wall is spaced upwardly from upper surface 13 of base 12, and provides open communication of channel 44 with the interior of the tank at 45.

Dirty effluent, as the term is used herein, is introduced into the interior of the tank through an inlet pipe or conduit 17 as is diagrammatically illustrated by arrow 7. The inlet pipe includes an upstanding portion 18 having an outlet port 19 through which the effluent is discharged near the center of the tank (arrow 9). Housing 20 is generally cylindrical and envelops outlet port 19 which is offset from the central axis thereof and includes a plurality of struts connecting a splash plate to the body of the housing 20, which struts define a series of circumferentially spaced openings 22 which direct the flow of effluent into the tank, as illustrated by arrows 21. The effluent may continuously flow into the tank and is maintained at the constant level L as determined by upper overflow lip or edge 23 of the outer wall 10. The settleable solid particles carried by the dirty effluent settle to the bottom of the tank as indicated by arrow 29, whereas the floatable particles accumulate at the surface of the effluent as indicated by arrow 27.

An effluent receiver such as, by way of example, trough or gutter 48, is secured to and carried by outer wall 10 and extends about the circumference of the tank. As the dirty effluent enters the tank at 19, the settleable particles settle to surface 13 of base 12 and the floatable particles float to the surface L of the effluent producing a "clean" effluent which is relatively free of both floatable and settleable particles. The "clean" effluent flows under lip 42 of inner wall 38 through opening 45 into channel 44 (arrow 11 and spills over lip 23 of wall 10 into gutter 48 (arrow 25). The effluent is discharged from the gutter into an effluent collector such as conduit 50, as illustrated at arrow 51, from which the effluent may be discharged into a conventional sewage disposal system. It will be noted that lip 49 of the gutter is substantially above fluid level L, and prevents any spillage from occurring at gutter 48.

An axial drive shaft 24 is suitably coupled to drive unit 26 and is adapted to rotate upper, skimmer arm 28 and lower, scraper arm 30 about the axis of tank 8. The skimmer arm is disposed at or just above fluid level L of the tank whereas the scraper arm is disposed adjacent the upper surface 13 of base 12. Skimmer blade 32 is secured to, carried by and depends from skimmer arm 28 and terminates in an outer end 36 which is adjacent inner wall 38. An elongate chamber 34 is secured to, carried by and projects inward from inner wall 38 and includes an elongate mouth 35 at or just above fluid level L. When rotated, the skimmer blade skims the surface of the effluent and accumulates the particulate matter floating thereon, wiping it from the surface of the effluent and into chamber 34. The collected particles are discharged from the chamber into a collector such as conduit 40 (arrow 41) from which the particles may be transferred to further processing stations (not shown).

Scraper arm 30 is simultaneously rotated by shaft 24 and scrapes the settleable particles which have accumulated at the bottom of the tank into trough 14 (arrows 31). As the particles are collected in trough 14, conveyor means such as, by way of example, horizontal worm screw or conveyor 54, which extends the entire length of trough 14 and is driven by a suitable drive mechanism 58 via means 56, transfers the collected particles in the form of sludge through conduit 59 to trough outlet 60 which is outside the outer shell 10 of the tank.

The sludge elevator of the present invention is designated generally by the reference numeral 52 and comprises a substantially vertically disposed, closed-ended conduit 62 having an inlet port 61 in open communication with outlet 60 of conduit 59 and an outlet or discharge port 66 located at a point above fluid level L of the tank.

A conveyor-elevator such as, by way of example, the worm or screw conveyor 64 is mounted in and carried by conduit 62 and is adapted to receive the sludge deposited at outlet 60 and transfer said sludge from outlet 60 to discharge port 66. As the sludge is elevated by conveyor 64 to a point above fluid level L (arrow 63), the excess fluid naturally drains from the sludge downwardly in conduit 62, seeking the level of fluid in tank 8. The remaining, solid particles are elevated to discharge port 66 in a form substantially free of excess fluid and are discharged into a collector such as conduit 68 (arrow 69), through which the sludge may be transferred to subsequent processing stations.

Discharge port 66 may be conveniently placed at any point sufficiently above fluid level L to permit proper drainage of the excess fluids from the sludge prior to discharge thereof. By way of example, uniformly satisfactory results have been obtained in those instances in which the discharge port 66 is disposed approximately 2 to 3 feet above fluid level L where the separator tank is approximately 25 feet in diameter and includes an inner wall which is approximately 12 feet in height, wherein the fluid level L is maintained at 11 feet, the horizontal conveyor is approximately 8 to 10 inches in diameter, and wherein the vertical conveyor-elevator is approximately 6 to 8 inches in diameter and is encased by a suitable conduit or housing which permits the free flow of fluids downwardly therethrough while elevating the solid particulate matter which is accumulated at outlet 60.

Among the many advantages of the present invention in addition to those specifically described herein, it should be noted in particular that the sludge elevator eliminates any guesswork involved in determining the solid/fluid ratio of the sludge prior to discharge thereof from the clarification system. Specifically, since fluid continuously drains from the elevated sludge, the material discharged through conduit 68 is maintained within a closely controlled solid/fluid ratio which is dependent upon the location of the discharge port with respect to fluid level L.

Therefore, from the foregoing, it can be seen that the present invention provides the means for and method of removing settleable particles from an effluent in a form wherein the removed particles are substantially free of excess fluid. The apparatus of the invention is adapted for use with conventional clarification systems of the type having a cylindrical separator tank including a substantially flat base or bottom, wherein an elongate trough in the bottom of the tank is disposed in communication with the interior thereof for collecting the settleable particles out of the effluent which is introduced therein. The collected particles are discharged from the tank above the fluid level thereof, whereby excess fluids automatically drain from the elevated particles back into the tank, after which the remaining particles are discharged in a form substantially free of excess fluid. Use of the present invention with a conventional clarification system promotes the efficient and economical recovery of settleable solids from an effluent while minimizing the cost and modification required in changeover and while retaining the many advantageous features of systems now in use.

What is claimed is:

1. A fluid clarification device for separating scum, sludge and clear fluid from a dirty effluent, comprising a cylindrical, separator tank having a flat bottom, a top, a rotatable shaft extending axially thereof for substantially the entire height of the tank, means on the tank top for rotating said shaft, an inlet pipe for dirty effluent extending upwardly into the tank from the bottom thereof and substantially coaxially therewith and having an effluent discharge opening upwardly presented for discharging dirty effluent axially within said tank in an upward direction, a cylindrical housing disposed coaxially around the inlet substantially at the center of the tank and having a cylindrical body, and a substantially circular splash plate having a shaft receiving opening centrally thereof receiving said rotatable shaft through said opening and located to be above said discharge opening and to extend radially outward from said shaft and in a downward direction so that the shaft receiving opening is above the outer circumferential edge of said splash plate, said discharge opening being offset from the central axis of said housing, said housing having a plurality of struts connecting said cylindrical body and said splash plate circumferential edge to define a plurality of generally radially and downwardly directed ports for directing the flow of dirty effluent impinging against said splash plate from the inlet discharge opening in a generally outward and downward direction into the tank at a level which is below the upper surface of liquid contained in the tank, an upstanding outer side wall and a vertical inner wall concentric with and spaced radially inwardly of the outer side wall to define therebetween a circumferential channel, the inner wall having a bottom edge spaced upwardly from the flat bottom a distance greater than the maximum depth of sludge which is accumulated on the bottom of the tank to define a fluid discharge port for discharging clean effluent from the separator tank, the discharge port being in open fluid communication with the circumferential channel for discharging clean effluent thereinto, said inner wall having an upper edge spaced above the upper edge of the outer wall to form a barrier for confining floatable particles within the tank, an annular trough secured to and surrounding an upper portion of the outer wall and in fluid communication with the circumferential channel for receiving clean effluent from the channel, an effluent collector connected to the annular trough for discharging effluent into a sewage disposal system, said trough having a lip on the outer circumferential edge thereof which lip is located above the fluid level to prevent spillage from the trough, an elongate chamber carried by and projecting inwardly from the inner wall and having an elongate mouth at the fluid level of fluid in the device and a conduit connected thereto for collecting matter from the chamber and transferring that matter away from the separator tank, said flat bottom having an elongate, radially extending, open-topped trough therein with the open top substantially coplanar with the flat bottom and in free, unobstructed, open communication with the bottom, an elongate, skimmer arm means carried by the shaft at the fluid level and rotatable in the device and having a skimmer blade depending therefrom to be immersed in the fluid a predetermined distance to sweep floatable particles from the surface of fluid in the device and into the chamber as the skimmer arm rotates with the rotatable shaft, scraper blade means carried by the shaft for rotation therewith and movement along the surface of the bottom to scrape settled particles from the bottom into the open-topped bottom trough, horizontally disposed screw-type conveyor means in the trough extending for substantially the entire length thereof and having an end portion extending outwardly beyond the outer wall to convey the particles in the form of sludge along the trough to beyond the outer wall, means for driving the horizontal conveyor means, a vertically extending conduit externally of the outer wall having a closed upper end and in fluid communication at a lower end portion thereof with the end of the conveyor means which extends beyond the outer wall and extending at its upper end upwardly a predetermined distance above the fluid level, and a vertically oriented screw-type conveyor means mounted in and carried by the vertically extending conduit for receiving sludge in said lower end portion thereof from said horizontal conveyor means and elevating the sludge to a discharge port at said closed upper end a predetermined distance above the fluid level to effect draining of the fluid from the sludge, whereby the discharged sludge is substantially free of excess fluid.

* * * * *